United States Patent [19]

Convis et al.

[11] 4,355,371
[45] Oct. 19, 1982

[54] INSTANTANEOUS ALPHA CONTENT PRESCAN METHOD FOR AUTOMATIC SPELLING ERROR CORRECTION

[75] Inventors: Danny B. Convis, Washington Grove; David Glickman, Frederick; Walter S. Rosenbaum, Bethesda, all of Md.

[73] Assignee: International Business Machines Corporation, Armonk, N.Y.

[21] Appl. No.: 133,707

[22] Filed: Mar. 25, 1980

[51] Int. Cl.³ .............................................. G06F 7/02
[52] U.S. Cl. .................................................... 364/900
[58] Field of Search .......... 340/146.3 WD, 146.3 ED; 364/200 MS File, 900 MS File

[56] References Cited

U.S. PATENT DOCUMENTS

| | | | |
|---|---|---|---|
| 3,568,156 | 5/1971 | Thompson | 364/900 |
| 3,760,355 | 9/1973 | Bruckert | 340/146.3 WD X |
| 3,969,698 | 7/1976 | Bollinger et al. | 340/146.3 WD |
| 3,995,254 | 11/1976 | Rosenbaum | 340/146.3 WD |
| 4,010,445 | 3/1977 | Hoshino | 340/146.3 WD |
| 4,068,301 | 1/1978 | Ishino et al. | 364/200 |

*Primary Examiner*—Harvey E. Springborn

[57] ABSTRACT

A system for reducing the computation required to match a misspelled word against various candidates from a dictionary to find one or more words that represent the best match to the misspelled word. The major facility offered is the ability to computationally discern the degree of apparent match that exists between words that do not perfectly match a given target word without requiring the computationally tedious procedure of character by character positional matching which necessitates shifting and realignment to accommodate for differences between the candidate and target words due to character differences or added and dropped syllables. The system includes a method for storing and retrieving words from the dictionary based on their likelihood of being the correct version of a misspelled word and then reviewing those words further to reduce the number of candidates that must then be examined in a high resolution positional match to find the candidate(s) which matches the misspelled word with the greatest character affinity. This technique reduces the number of candidates in contention so as to make a high resolution match computationally feasible on a real-time basis. The discriminant potential and the real-time computational burden associated with the technique are balanced in an optimal manner.

6 Claims, 2 Drawing Figures

INSTANTANEOUS ALPHA CONTENT PRESCAN METHOD FOR AUTOMATIC SPELLING ERROR CORRECTION

BACKGROUND OF THE INVENTION

1. Field of the Invention

This invention relates to text processing and, more particularly to methods for automatically prompting an operator with the correct spelling of a misspelled word.

2. Description of the Prior Art

In implementing a practical automatic spelling aid system the ultimate number of words that must be examined by a high resolution match algorithm which adjusts for aliased characters and dropped or added characters/syllables determines the practicality of the system in terms of both cost and efficiency of operation.

Procedures have been evolved in the prior art for reducing the number of candidate words that must be examined relative to a target misspelled word to find the best matched candidate or candidates. One technique involves only looking at those words which match the misspelled word in its first character and are not greater or less in length than it by more than two characters. This approach is based on the supposition that the most reliable character in a misspelled word is always the first character and that normal misspelling would not yield more than a two-character addition or deletion.

A second technique for reducing the number of candidates that must be examined relative to a target misspelled word to determine the best matched candidate requires use of a vector fetch approach which assigns to each word in the dictionary a magnitude value based on the confusibility of the characters in the word where a character's weight in the magnitude computation is clustered close to those characters that it could be aliased as. Only those words in the magnitude "range" of the misspelled word are retrieved.

A third technique for reducing the number of candidates that must be examined relative to a target misspelled word to determine the set of best matched candidates is to examine all words of equal length to the misspelled word or within plus or minus two character positions regardless of first character.

However, because the dictionary size may be quite large (i.e., many times over 50,000 words), even a discriminant which will preclude 99% of the dictionary from review will still lead to a large set of words which must be examined to determine the best match candidates relative to a misspelled word. The first technique, although effective, leads to non-recoverable errors when the first character is in error and normally does not have a discrimination potential greater than 90%. The second technique has a higher average discrimination potential using the Cluster Storage Apparatus disclosed in U.S. Pat. No. 3,969,698, but still yields more than 1% of the dictionary for final review. The combination of the first and second techniques with the double storing of words that have highly ambiguous or silent first characters, (e.g., "philosophy" under the "P" and under "F", "knot" under "K" and under "N"); together yields a discrimination potential of roughly 99%. This, however, as mentioned, still leaves for large dictionaries more words than can be conveniently handled in a real-time manner for discrimination of the best candidate matches against a target misspelled word. The further discrimination using an independent criteria not used above is required to additionally reduce the word list down to a size that can be conveniently processed in a real-time manner to determine the best candidate match(es) against the target misspelled word. This problem is further accentuated by the fact that after 99% of the words have been discriminated, the remaining one percent tend to be more homogeneous in content and therefore, less amenable to cursory methods of examination and further culling.

Further candidate word discrimination can be achieved as taught in application Ser. No. 6/108,000, filed Dec. 28, 1979, entitled "Alpha Content Match Prescan Method For Automatic Spelling Error Correction" by D. Glickman, et al., by inventorying, without regard to position, the respective characters in the misspelled word and in each of the dictionary candidate words where a candidate word is dismissed from additional processing if there is not a predetermined percentage match between its character content and that of the misspelled word. This process can be performed upon the set of words resulting from use of said Cluster Storage Apparatus and yield a further factor of 10 reduction in candidate words. Although the candidate word reduction achieved is salutory, the increment in the real time computation requirement is not absolutely minimized.

SUMMARY OF THE INVENTION

It has been discovered that using specific characteristics of the alpha content of words resulting from a fetched discrimination using a match on first alpha character and vector magnitude range, they can be further discriminated in a very high speed minimal computational manner by examination of a bit mask whose bit settings are set to reflect the presence or absence of specific characters or character combinations without regard to position in the misspelled word and in each of the dictionary candidate words where a candidate word is dismissed from additional processing if there is not a predetermined percentage of bit mask match between the mask of the misspelled word and the candidate word.

DESCRIPTION OF THE PREFERRED EMBODIMENT

Figure 1:
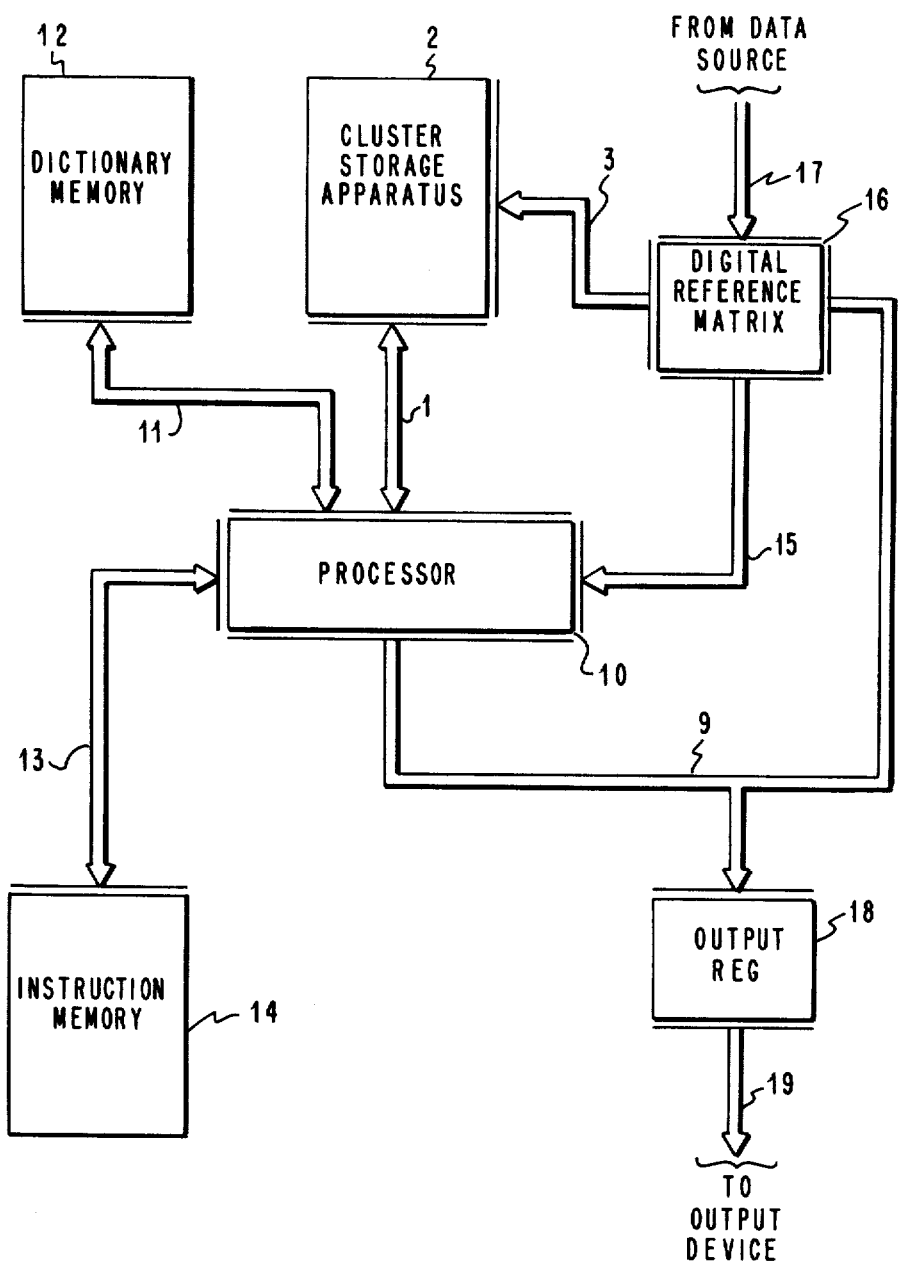
FIG. 1 is a block diagram of some components in the Instantaneous Alpha Content Prescan System.

Referring to FIG. 1, there is shown a block diagram of the Spelling Correction System which includes a processor or CPU 10 of the general purpose type, such as the IBM Series 1 or Intel 8086 which is in two-way communication over a bus 13 with a memory 14 containing the instructions which control its operation and define the present invention. The processor 10 is also in two-way communication with the dictionary memory 12 over bus 11 wherein a vocabulary of words is stored.

The processor 10 is also in two-way communication over data bus 1 with cluster storage apparatus 2 and in communication with digital reference matrix 16 over bus 15. The cluster storage apparatus 2 is disclosed in U.S. Pat. No. 3,969,698, issued July 13, 1976 to E. W. Bollinger et al, assigned to the same assignee as the present application and expressly incorporated herein by reference. The digital reference matrix 16 is fully disclosed in U.S. Pat. No. 3,995,254 issued Nov. 30, 1976 to W. S. Rosenbaum, assigned to the same assignee as present application and expressly incorporated herein by reference.

Text words are input to the system over bus 17 from a conventional data source such as a keyboard or character recognition device or from a storage device such as magnetic or electronic memory. The digital reference matrix has stored therein a dictionary of words in the form of vector representations consisting of a magnitude and an angle for each word. An input word is converted to a vector representation and the magnitude factor is used as an address to access the digital reference matrix memory to determine if an angle is stored therein for the word. If an angle is found in the digital reference matrix 16, at the magnitude address which matches the angle calculated for the input word, then an indication that the word is spelled correctly is provided to the processor over bus 15 and the word is output to the output register 18 over bus 9. If no matching angle is found in the digital reference matrix 16, at the magnitude address, or if the calculated magnitude address does not match an address in the digital reference matrix memory, then the input word is considered misspelled and an indication is provided to the processor 10 over bus 15. If the digital reference matrix 16 indicates that the word is misspelled, then the characters from the word are passed to the cluster storage apparatus 2 over bus 3 and to the processor 10 over bus 15. The cluster storage apparatus contains representations of groups of alpha characters in vector format arranged such that adjacent locations contain alpha characters having similar character recognition misread propensities and keyboard substitution misstroke error propensities. The theory for grouping characters in the cluster storage apparatus is fully disclosed in U.S. Pat. No. 3,969,698. The cluster storage apparatus examines the characters of the input word and outputs a number of representations of character combinations over bus 1 to the processor 10 which are likely candidates for the correct version of the input word. The character combinations are used by the processor to select candidate words from the dictionary memory 12.

However, as was previously stated in the background section of this application and as stated in U.S. Pat. No. 3,969,689, the number of words output by the cluster storage apparatus will average about 1% of the words stored in the dictionary. Further, as previously stated, discrimination down to one-tenth of 1% of the words stored in the dictionary is feasible performing the alpha content match prescan algorithm of Application Ser. No. 6/108,000. However, this incurs an increase in the real-time computational requirement of the system. The processor 10 under direct control of the instructions in the instruction memory 14 that defines the present invention will further process the outputs of the cluster storage apparatus using the contents of dictionary memory 12 to reduce the number of output candidate words by nearly an order of magnitude without the attendant time penalty required in the prior art.

The preferred embodiment of the present invention uses an 8 bit (1 byte) mask appended to each dictionary word where each bit in the mask represents the presence or absence of a character or character set in the subject word by a bit setting of binary one or zero, respectively. However, it is understood that the presence of a character or character set can be repesented by a bit setting of zero and the absence by a bit setting of one. For example;

bit 1 implies presence/absence of M or N
bit 2 implies presence/absence of L
bit 3 implies presence/absence of S or C or K
bit 4 implies presence/absence of R
bit 5 implies presence/absence of PH or F
bit 6 implies presence/absence of B or V
bit 7 implies presence/absence of G or J
bit 8 implies presence/absence of W In general, the bits are equivalent to the characters that have the best misspelling reliability as measured from emperical data and related analytically using a relation of the form:

$$I_{ai} = (\log_2 P_{ea_i} - \log_2 \text{Max } P(a_i a_j))(\log_2(P a_i + P a_j))$$

where $P_{ea_i}$ is the probability of error of the $i^{th}$ character, a is the likelihood of occurrence of the character in the word, $P(a_i\ a_j)$ is the probability that character $a_i$ would occur instead of character $a_j$.

This gives the most weight to characters that have high reliability and moderate frequency. If the reliability of a character is only high if the aliasing of the "$a_j$" of the character is taken into account then a bit is set to reflect presence or absence of either $a_i$ or $a_j$.

Figure 2:
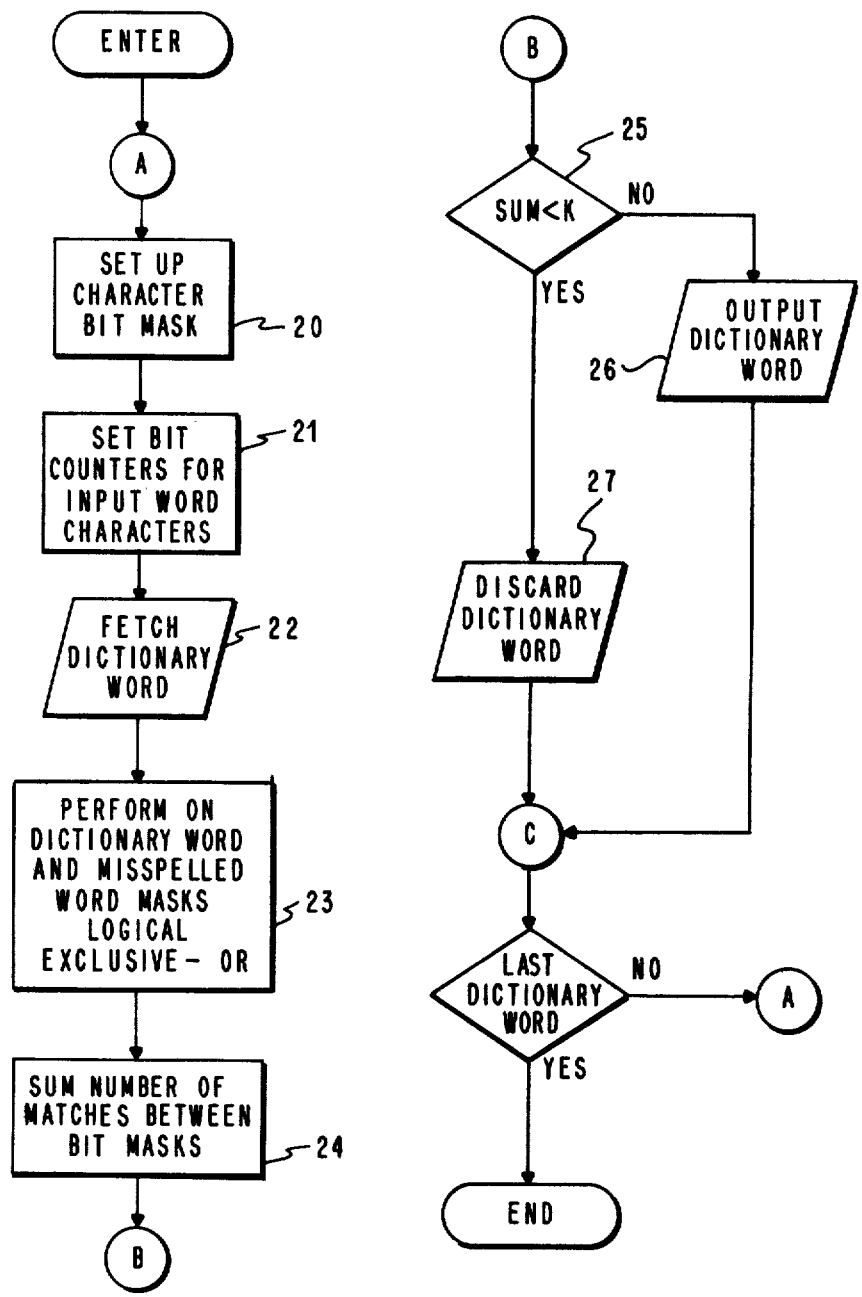
FIG. 2 is a flow chart of the operation of the Instantaneous Alpha Content Prescan System of this invention.

Referring now to FIG. 2, there is shown a flow chart of the operation of the instantaneous alpha content prescan algorithm of the present invention. At block 20 a bit mask counter is set up for setting each bit in the bit mask of the input misspelled word. The presence of each character or set of characters as defined above in the input misspelled words causes the related bit (1–8) in the bit mask counter to be turned on (set to binary one). The bit mask counter for the misspelled word is set at block 21. Although, in theory, the bit masks for the dictionary candidate words could be set after the cluster storage apparatus 2 has yielded a subset of dictionary candidate words, this would add to the real-time computation requirement and it is the objective of this invention to absolutely minimize the real-time computation requirement while only minimally compromising the discriminant potential. Hence, in the preferred embodiment all words in the dictionary memory 12 have their respective bit masks precomputed at the time of dictionary compilation and appended to the respective dictionary words. The process used to set the bit mask of the misspelled word is identical to the process used to precompute the respective bit masks for each dictionary word that is, the assignment of characters or character sets to bits is identical. Hence the dictionary word bit mask processing is not separately described.

At block 22 each word in the dictionary memory 12 corresponding to the words output by the cluster storage apparatus 2 is fetched and has its bit mask examined relative to the bit mask of the misspelled word at block 23. A logical EXCLUSIVE-OR operation is performed on the bit masks of the input misspelled word and the dictionary word and the number of matches, output zeros, is summed at block 24. At block 25 the number of bit matches are tested relative to a predetermined threshold. In the preferred embodiment, a threshold of 60% match has been selected. The words which exceed the threshold value are output by the processor at block 26 to output register 18 over bus 9 where they are available for analysis on a character by character basis to determine the most likely candidate that is the correct spelling of the input misspelled word. The words that do not match the threshold are discarded at block 27. This process is executed for each word in the candidate list yielded by the cluster storage apparatus 2.

Table 1 is a program routine in pseudo code for implementing the instantaneous alpha content prescan algorithm of this invention. The application and use of pseudo code is described in "An introduction to Programming" (A Structural Approach Using PL/1 and PL/C-7,) Second Edition by Richard Conway and Davie Gries, Winthrop Publishers, Cambridge, Mass., Copyright 1975.

Table 1. INSTANTANEOUS ALPHA CONTENT PRESCAN ALGORITHM
ENTER
INITIALIZE CHARACTER INFORMATION BIT MASK (CIB) FOR THE MISSPELLED WORD FOR ANALYSIS
GET THE MISSPELLED WORD
DO FOR EACH LETTER IN THE MISSPELLED WORD
  IF THIS LETTER IS CHARACTER #1, THEN TURN ON CHARACTER #1 BIT MASK IN CANDIDATE CIB
  ELSE
    IF THIS LETTER IS CHARACTER #2, THEN TURN ON CHARACTER #2 BIT MASK IN CANDIDATE CIB ETC.
    ENDIF
  ENDIF
  POINT TO NEXT LETTER IN THE MISSPELLED WORD
ENDDO
DO FOR EACH APPLICABLE DICTIONARY ENTRY
  FETCH THE NEXT DICTIONARY WORD
  PERFORM A LOGICAL EXCLUSIVE DISJUNCTION FUNCTION ON
    THE MISSPELLED WORD CIB WITH A WORK BYTE OF ALL ONES (REVERSE THE WORK CIB BIT SETTINGS) AND SAVE IN BUFFER 1
  PERFORM A LOGICAL EXCLUSIVE DISJUNCTION BETWEEN THE DICTIONARY WORD AND BUFFER 1
  IF LESS THAN 4 BITS IN BUFFER 1 ARE SET TO ONE THEN DISCARD DICTIONARY WORD AS FAILING THE INSTANTANEOUS ALPHA CONTENT PRESCAN MATCH ALGORITHM
  ELSE
    OUTPUT WORD AS PASSING THE INSTANTANEOUS ALPHA CONTENT PRESCAN ALGORITHM
  ENDIF
ENDDO
LEAVE LETTERS OR LETTER SETS TO BE USED AS COMPARATORS. ONE SUCH GROUPING IS:
CHARACTER 1 = M, N
CHARACTER 2 = L
CHARACTER 3 = C, K, S
CHARACTER 4 = R
CHARACTER 5 = PH, F
CHARACTER 6 = B, V
CHARACTER 7 = G, J
CHARACTER 8 = W While the invention has been shown and described with reference to a specific set of computer instructions, bit mask match threshold values an 8-bit (1-byte) bit mask, it will be understood by those skilled in the art that the spirit of this invention can be implemented in other computer languages, with different match threshold values and other bit mask configurations, such as a 24 or 26 position bit mask which more directly would relate to each alphabetic character, or similar configurations can be modified without avoiding the scope of the invention claimed herein.

What is claimed is:

1. In a process for automatically detecting and correcting input misspelled words, a method for improving the selection from a dictionary memory of the set of correctly spelled target words most nearly equal to the input misspelled word while minimizing real-time computational requirements without recourse to a character by character positional match comprising the steps of:
    (a) predefining a set of characters or character sets having misspelling reliability;
    (b) defining a bit mask having one bit position for each predefined character or character set;
    (c) reviewing each dictionary word and setting a binary bit in the corresponding bit position of the bit mask to reflect the presence of said predefined character or character set;
    (d) appending the bit mask to the dictionary word in storage;
    (e) reviewing each input misspelled word, and setting bits in a binary counter to reflect the presence of said predefined character or character sets within the misspelled word;
    (f) determining the EXCLUSIVE OR between the binary counter of the input misspelled word and the bit mask of each respective dictionary target word;
    (g) comparing the output of the EXCLUSIVE OR operation to a predetermined threshold value;
    (h) selecting those dictionary target words whose EXCLUSIVE OR'ed output exceeds the threshold value; and
    (i) outputting the selected dictionary target words for further processing.

2. The method of claim 1 wherein binary one bits are set in the bit mask of step c and in the binary counter of step e.

3. The method of claim 1 wherein binary zero bits are set in the bit mask of step c and in the binary counter of step e.

4. In a system for automatically detecting and correcting input misspelled text words, an improvement for decreasing the size of the set of text words selected from a dictionary of text words that approximate the correct spelling of the input misspelled word while minimizing real-time computational requirements without recourse to a positional character by character comparision comprising:
    a dictionary memory for storing the correct spelling of a plurality of text words;
    a binary mask appended to each text word in said dictionary memory for storing a binary bit for each character of a predetermined character set contained in the text word;
    means for defining a bit mask counter having one bit position associated with each character of said predefined character set;
    means for comparing the characters of an input misspelled word to the predetermined character set;

means for setting the associated bit position in said bit mask counter in response to each equal compare;

a cluster storage means for storing a plurality of representations of text words arranged in accordance with the error propensity of the characters of said text words;

means for outputting from said cluster storage means the group of representations of text words containing the same error propensity characters as the input misspelled word;

means for selecting from said dictionary memory the plurality of correctly spelled words corresponding to the representation output from said cluster storage means;

means for taking the EXCLUSIVE OR of the binary mask associated with each selected dictionary word and the bit mask counter of the input misspelled word; and means for outputting each dictionary word when the EXCLUSIVE OR output exceeds a preset threshold.

5. The improvement of claim 4 wherein said binary mask and said bit mask counter each has binary one bits set to indicate the presence of characters of said predefined character set.

6. The improvement of claim 4 wherein said binary mask and said bit mask counter each has binary zero bits set to indicate the presence of characters of said predetermined character set.

* * * * *